No. 707,463.   J. D. TWIGGS, Jr.   Patented Aug. 19, 1902.
ROLLER BEARING.
(Application filed Feb. 17, 1900. Renewed May 16, 1902.)
(No Model.) 2 Sheets—Sheet 1.
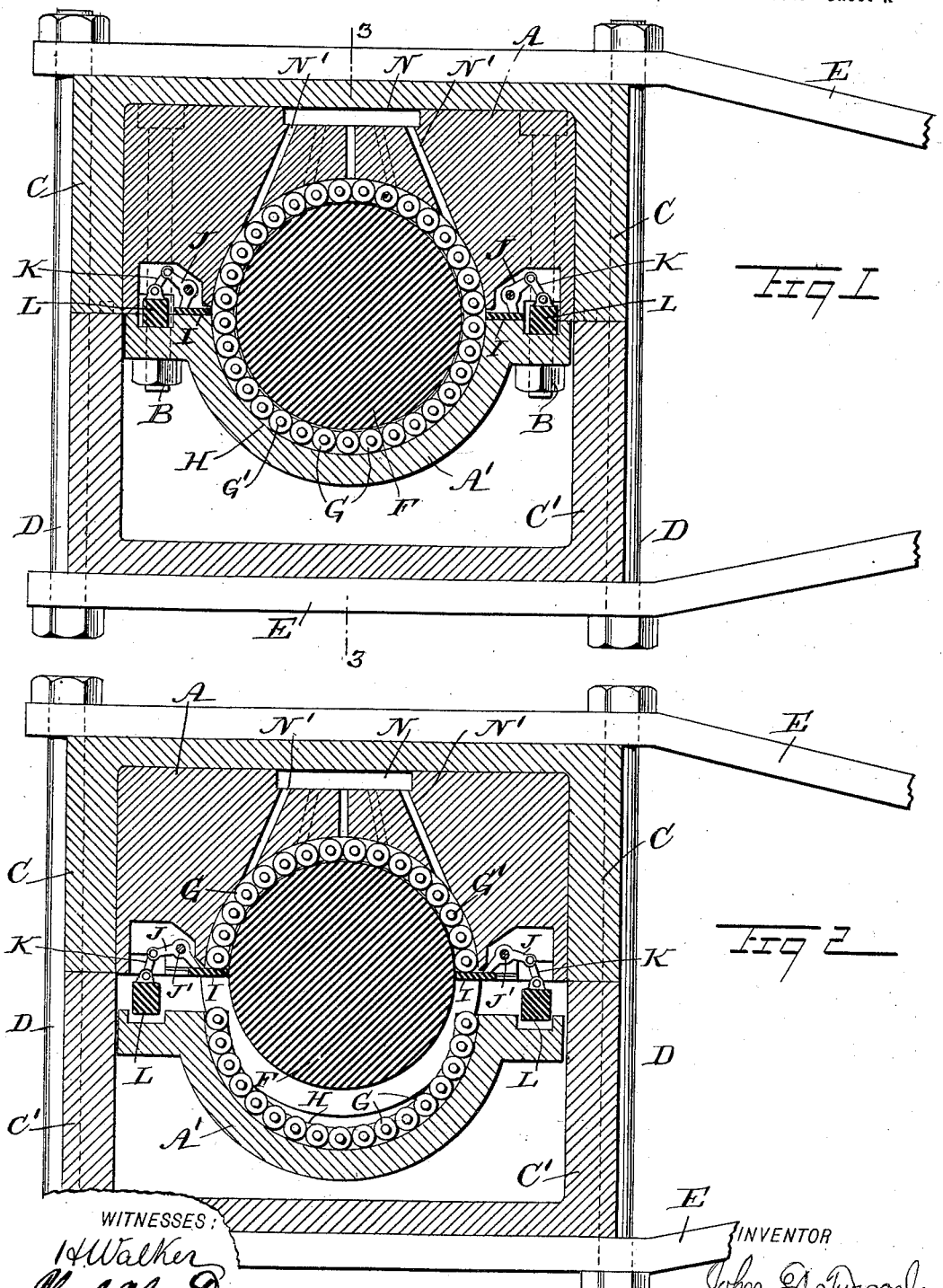

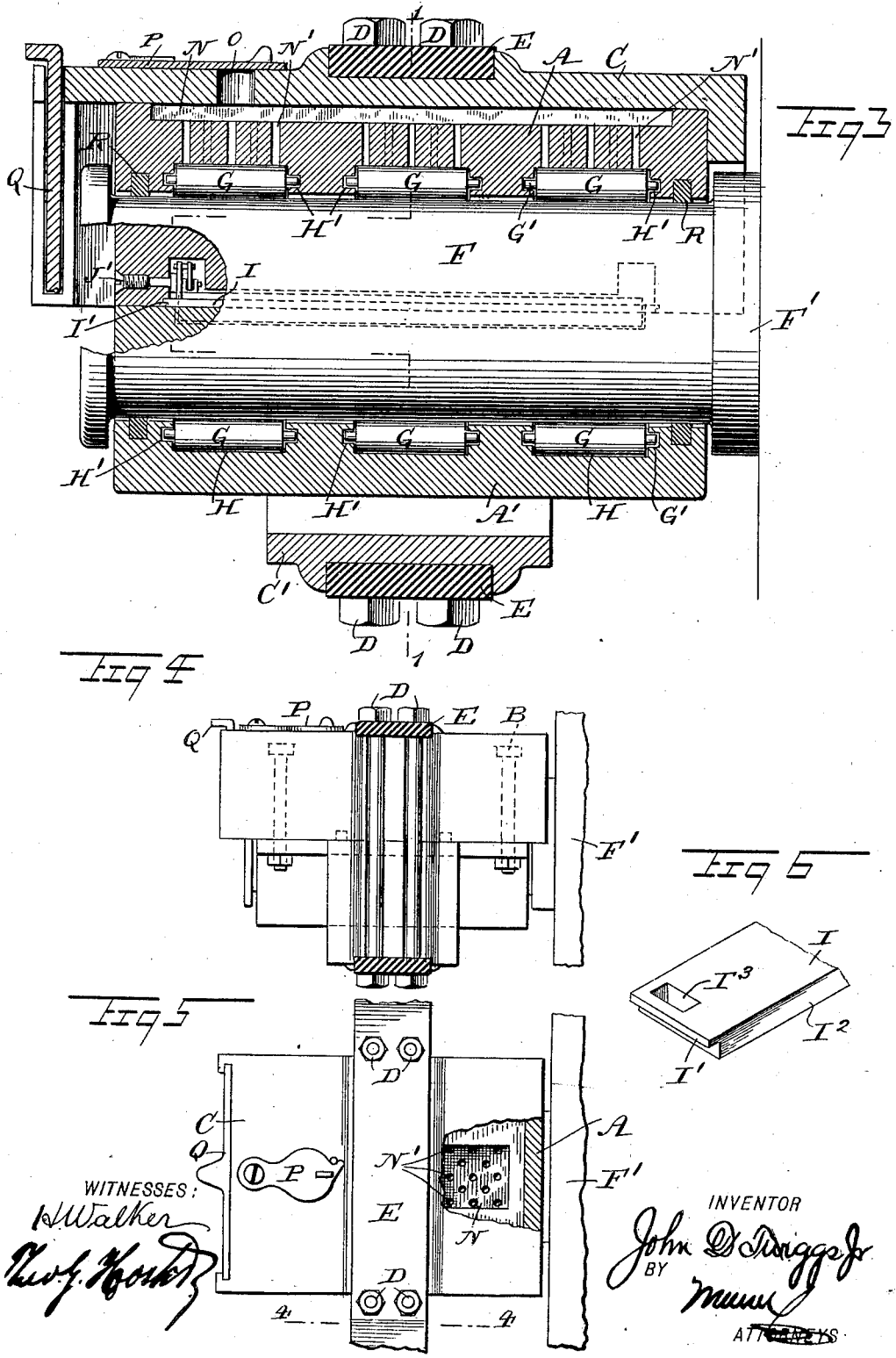

UNITED STATES PATENT OFFICE.

JOHN D. TWIGGS, JR., OF NEW YORK, N. Y.

ROLLER-BEARING.

SPECIFICATION forming part of Letters Patent No. 707,463, dated August 19, 1902.

Application filed February 17, 1900. Renewed May 16, 1902. Serial No. 107,684. (No model.)

*To all whom it may concern:*

Be it known that I, JOHN D. TWIGGS, Jr., a citizen of the United States, and a resident of the city of New York, borough of Manhattan, in the county and State of New York, have invented a new and Improved Roller-Bearing, of which the following is a full, clear, and exact description.

The invention relates to axle journals and bearings for rolling-stock and other devices and machines; and its object is to provide a new and improved roller-bearing arranged to reduce the friction of the parts to a minimum to hold the rollers in position when opening the bearing for examination or repairs, to insure a proper lubrication of the parts at all times, and to render the bearing dust-proof.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement on the line 1 1 in Fig. 3. Fig. 2 is a similar view of the same with the bearing partly opened. Fig. 3 is a transverse section of the improvement on the line 3 3 in Fig. 1. Fig. 4 is a reduced cross-section of the improvement on the line 4 4 in Fig. 5.
Fig. 5 is a plan view of the same with part broken out, and Fig. 6 is a perspective view of one of the roller-retaining plates.

The roller-bearing illustrated in the drawings is provided with a block made in two sections—an upper section A and a lower section A', fastened by bolts B to the upper section—said block being contained in a box likewise made in two parts C C', fastened together by bolts D, which also engage the usual arch and tie-bars E of the ordinary car-truck. The journal F of the axle F' extends into the block, and the peripheral surface of the said journal is engaged by sets of rollers G, each set being mounted to travel in an annular raceway H, formed in the sections A A' of the block, as will be readily understood by reference to Figs. 1, 2, and 3. Each of the rollers in a set is formed at its ends with trunnions G', projecting into annular grooves H',
formed in the end walls of the raceway H, (see Fig. 3,) so that when the journal F is rotating the rollers G travel on the peripheral surface of the journal and also in the annular raceway H, the trunnions G' traveling in the annular grooves H', so as to hold said rollers in proper position, it being understood that adjacent rollers are in frictional contact with the peripheral surface of the journal F and the inner wall of the raceway.

In order to hold the rollers G contained in the upper portion of the raceway in position when the section A' of the block is removed from the section A, I provide retaining devices, one located on each side of the journal-bearing, within the block, between the sections A A' thereof, as is plainly indicated in Figs. 1 and 2. Each retaining device is provided with a plate I, formed at its ends with guides I', mounted to slide in suitable bearings formed on the under side of the section A, and the inner edge $I^2$ of the plate is adapted to readily pass between adjacent rollers in the raceway H when the plate I is moved in an inward direction. Normally the plate I stands out of the raceway H, as shown in Fig. 1, and is held in this position by bell-crank levers J, fulcrumed at J' in the section A and each extending with one arm into a slot $I^3$, formed in one end of the plate I. Each bell-crank lever J is connected at the other arm by a link K with a weight L, normally resting on the top of the section A' when the latter is secured in position on the section A by the bolts B; but when the nuts on the bolts B are unscrewed and the section A' is moved downward then the support for the weights L is removed, and consequently said weights pull on the levers J, so as to cause the same to swing the plates 1 inward under the lowermost rollers in the upper section A to hold the rollers of this section in position, while the section A', with the rollers G contained therein, is removed from the journal in the section A. (See Fig. 2.) Thus by the arrangement described the section A' can be conveniently removed witout disturbing the rollers G in the upper section A, and when the lower section A' is again secured in place on the upper section A by the bolts B then said lower section A' again engages the weights L, lifts the same, and forms a support therefor to cause the levers J to swing in an opposite direction to move the plates I outward out of engagement with the corresponding rollers G.

In order to properly lubricate the bearing, the top of the section A is provided with a lubricating-reservoir N, preferably formed by producing a suitable cavity in the top of said section, as illustrated in the drawings. From the bottom of this lubricating-reservoir N lead a number of channels N' into the upper portion of each raceway H, so as to allow the lubricant contained in the reservoir to flow by its own gravity when liquefied by heat through the channels into the raceway and to the rollers G. When the lubricant is cool, it rubs in stick form on the rollers G. The top of the reservoir N is formed by the top of the casing or box section C, and in the latter is arranged a filling-opening O, normally closed by a hinged lid P, which when open allows of filling the reservoir with lubricant. The free end of the casing or box C is provided with a removable lid Q, mounted to slide in vertical guideways formed in the sides of the upper section of the casing C, as is plainly shown in Fig. 3.

In order to prevent dust from passing to the roller-bearings, the sections A A' of the box contain packing-rings R at their ends, as plainly shown in Fig. 3, said packing-rings being set in suitable recesses, their inner edges being in contact with the journal F.

As illustrated in Fig. 3, three sets of rollers G are employed; but it is evident that but one such set, or two, or more than three may be employed, if desired, and hence I do not limit myself to the number of rollers shown.

Having thus fully described my invention, I claim as new and desire to secure by Letters Patent—

1. A roller-bearing, comprising a block made in sections removably connected together and formed with an annular raceway, rollers mounted in said raceway and adapted to travel therein and on the peripheral surface of the journal, and a retaining device carried by the upper section of the block for holding the rollers in position in the upper section of the said block when the lower section is removed, substantially as shown and described.

2. A roller-bearing, comprising a block made in sections removably connected together and formed with an annular raceway, rollers mounted in said raceway and adapted to travel therein and on the peripheral surface of the journal, and automatically-movable retaining devices carried by the upper section of said block, and arranged to automatically retain the rollers in the upper section in position upon removing the lower section, substantially as shown and described.

3. A roller-bearing, comprising a block made in sections removably connected together and formed with an annular raceway, rollers mounted in said raceway and adapted to travel therein and on the peripheral surface of the journal, and a retaining device for holding the rollers in position on the upper section of the said block when the lower section is removed, the retaining device being normally held out of engagement with the rollers by the lower block-section as long as the latter is secured in place in connection with the upper section, substantially as shown and described.

4. A roller-bearing, comprising a block formed with an annular raceway, rollers mounted in said raceway, and a lubricant-reservoir on the top portion of the block and extended lengthwise of the rollers and connected by conducting-channels with the annular raceway to lubricate the rollers by a lubricant flowing by gravity from the reservoir, substantially as specified.

5. A roller-bearing comprising a block formed with an annular raceway, rollers mounted in said raceway, a lubricant-reservoir on the top of the upper portion of the block and extended lengthwise of the rollers, the said reservoir communicating with the raceway, and a casing or box containing said block and having filling-holes for filling the said reservoir with lubricant, substantially as specified.

6. A roller-bearing, comprising a block made in sections removably connected together and formed with an annular raceway, rollers mounted in said raceway, and adapted to travel therein and on the peripheral surface of the journal, a retaining device for holding the rollers in position in the upper section of the said block when the lower section is removed, said retaining device comprising a retaining-plate mounted to slide on the under side of the upper block-section at one side of the rollers, and a weighted lever fulcrumed on the upper section and engaging the said plate, to shift the latter inward under the lowermost roller in the upper section upon removing the lower section, substantially as shown and described.

7. A roller-bearing, comprising a block made in sections removably connected together and formed with an annular raceway, rollers mounted in said raceway and adapted to travel therein and on the peripheral surface of the journal, a retaining device for holding the rollers in position in the upper section of the block when the lower section is removed, said retaining device comprising a retaining-plate mounted to slide on the under side of the upper block-section at one side of the rollers, and a weighted lever fulcrumed on the upper section and engaging the said plate, to shift the latter inward under the lowermost roller in the upper section upon removing the lower section, the weight on the lever normally resting on the lower section, substantially as shown and described.

In testimony whereof I have signed my name to this specification in the presence of two subscribing witnesses.

JOHN D. TWIGGS, JR.

Witnesses:
ALFRED H. DAVIS,
EVERARD BOLTON MARSHALL.